B. HOLLY.

Street Main.

No. 9,730. Reissued May 31, 1881.

*Witnesses:*
N A Hall
J. P. Thos. Lang.

*Inventor*
Birdsill Holly
by his attys
Mason Fenwick & Lawrence

N. PETERS, Photo-Lithographer, Washington, D. C.

UNITED STATES PATENT OFFICE.

BIRDSILL HOLLY, OF LOCKPORT, NEW YORK.

STREET-MAIN.

SPECIFICATION forming part of Reissued Letters Patent No. 9,730, dated May 31, 1881.

Original No. 193,088, dated July 17, 1877. Application for reissue filed April 23, 1881.

*To all whom it may concern:*

Be it known that I, BIRDSILL HOLLY, a citizen of the United States, residing at Lockport, in the county of Niagara and State of New York, have invented a new and useful improvement in street mains or pipes for supplying large districts with heat for warming dwellings and for other purposes, and with power for driving machinery and for other purposes, of which the following is a specification.

The street-mains and service-pipes which are hereinafter described are specially useful in connection with a new mode of construction of apparatus for supplying large districts of dwellings with heat for warming and other useful purposes, and with power for driving machinery, shown in Letters Patent No. 193,086, dated July 17, 1877, granted to me.

The nature of my present invention consists in a new mode of construction of and laying of underground heat-and-power-supplying street-mains provided with service-pipes, whereby any longitudinal displacement of a section of a main at or near the center of its length is prevented, while the necessary expansion and contraction of the section on either side of said center is secured, such expansion and contraction occurring in both directions from at or near the center or middle of the length to the extremities of the section. With this construction, the service-pipes, if necessary, may be attached at or near the middle of a section, at which point the section is immovable, and therefore very little if any deflection of the service-pipes would occur.

Figure 1:
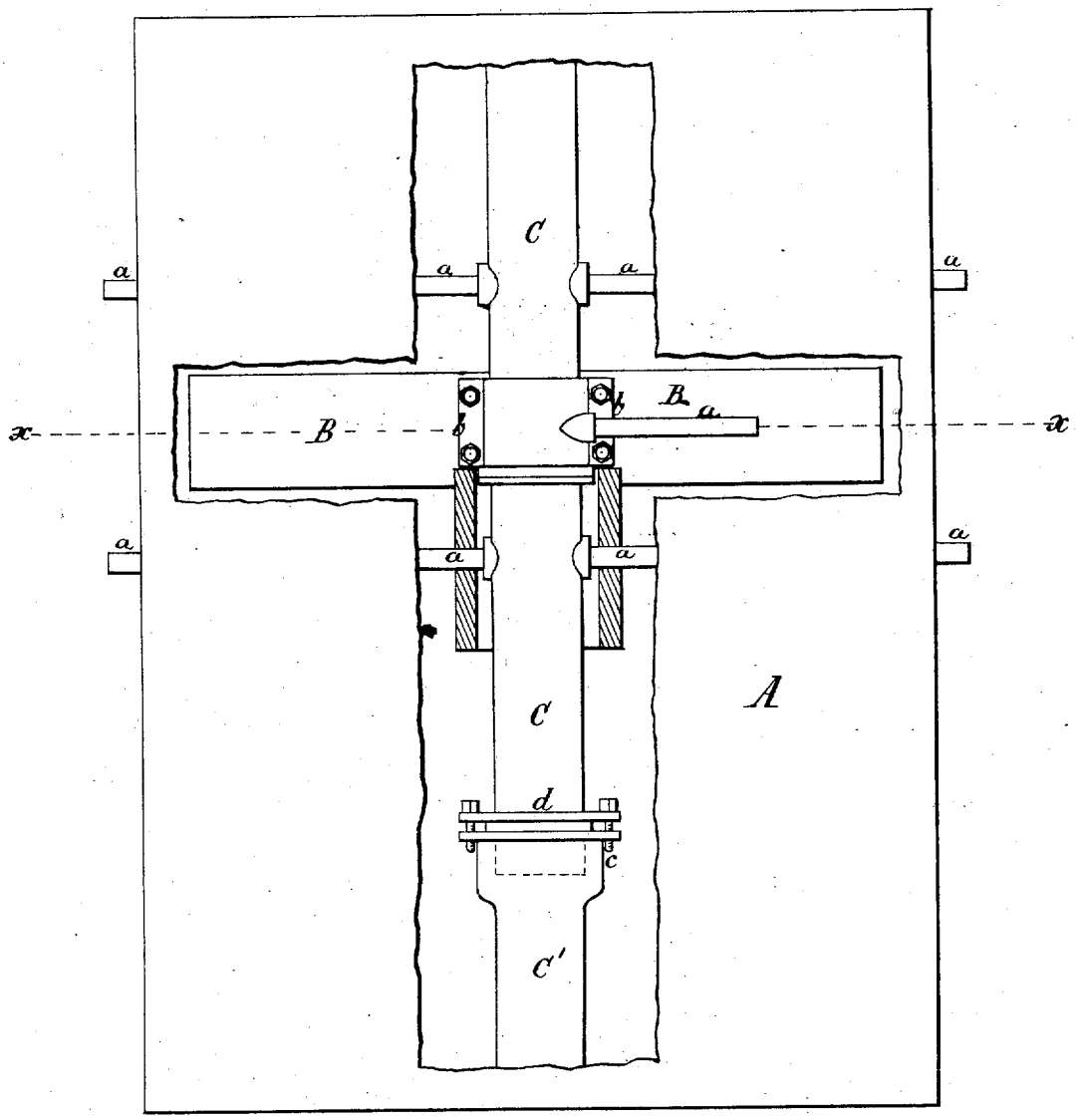
Figure 2:
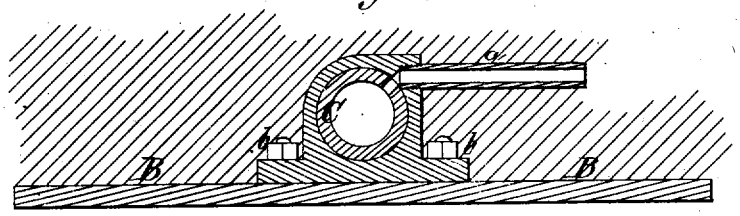

Figure 1 of the accompanying drawings is a top view and partial sectional view of portions of a street-main line of metal pipes provided with metal service-pipes, and constructed and laid down in accordance with my invention. Fig. 2 is a transverse sectional view of the same in the line *x x* of Fig. 1.

A in the drawings may be supposed to indicate a foundation for sustaining the parts, which I will now proceed to describe.

B is a strong support or saddle, firmly held in position by having its lateral portions projected out into the earth and fastened in any proper manner.

C C′ are sections of a street-main.

The section C may be provided with a service-pipe, *a*, at the support or saddle B, or near thereto. This section C of the main pipe is firmly bolted to the support or saddle B, as illustrated at *b*. The section C of the main pipe being, say, about one hundred feet long, there will be about fifty feet of main pipe on each side of the support or saddle B, and the longitudinal expansion and contraction and consequent movement of these fifty feet of metal pipe ought not to be restrained on either side of the support or saddle B; and to provide for this movement of the section C of the main pipe on each side of the support or saddle while the center of such section of the main pipe is held immovable on the support or saddle B, and at the same time to prevent leakage of the main while this movement is occurring, each of the ends of the section of pipe C, which is bolted to the support or saddle, is inserted a considerable distance into an enlarged end, *c*, of adjoining sections similar to section C′, of the main, and made steam-tight by a ring of packing, pressed upon by a follower, *d*, which is screwed tight upon the packing in the manner shown, or in any other proper manner.

Under this mode of construction and laying of main pipes and their service-pipes for supplying heat for warming and other purposes and power for operating machinery, the section C may be held immovable upon the support or saddle at or near the center of its length, and the necessary expansion and contraction on both sides of this point of support may be secured without any longitudinal displacement of the main at its point of support on the said support or saddle B. By holding the pipe immovable at or near the center of its length the deflection of the service-pipes, should they be attached to the section C of main-pipe at or near the support or saddle B, will be so slight that they will remain at, or nearly at, a right angle with the main. Were the section C of the main not made immovable at or near the middle of its length, and the sections C and C′ not provided with an expansion-joint at each end, or were they provided with such joint only at one end, the movement of the entire section C in one direction would cause a very great deflection of the service-pipes if they were attached to this section from lines at right angles to the main pipe.

With my construction, the aggregated expansion on each side of the support or saddle will lengthen the section C of main pipe, say, about one or two inches, and this increased length, half on one side and half on the other side of the support or saddle B, will be received into the enlarged packed ends *c* of sections similar to C′; and thus, while the expansion is permitted and leakage avoided, a bodily longitudinal displacement of the section C is prevented by the strong and permanently-seated support or saddle B, to which the section C is bolted, at or near the middle of its length.

In laying down the street-mains for supplying heat for warming purposes and power for driving machinery I may adopt the mode described in Letters Patent No. 193,086, granted me July 17, 1877, of covering the mains for the purpose of preventing undue loss of heat and power between the points of its supply and consumption; and at necessary or convenient points accessible junction-boxes may be provided, for the purpose of getting at various valves or cocks of the main service-pipes.

The agent which I have found the most practical and successful for producing heat and furnishing power is steam.

What I claim as my invention, and desire to secure by Letters Patent, is—

1. In an underground heat-and-power-supplying street-main, in which provision is made for accommodating the longitudinal expansion and contraction thereof, the combination, with a section of such main, of a confining support or saddle, placed at or near the center of the length of said section, for preventing longitudinal displacement of the said section at this point while expansion and contraction are occurring in the said section in opposite directions from the said support or saddle to the extremities of the section, substantially as and for the purpose described.

2. A section of an underground heat-and-power-supplying street-main, held immovable at a point between its extremities by an immovable retaining-support, substantially as and for the purpose described.

Signed in presence of two subscribing witnesses.

BIRDSILL HOLLY.

Witnesses:
B. F. BISHOP,
B. D. HALL.